US009887408B2

(12) United States Patent
Imai et al.

(10) Patent No.: US 9,887,408 B2
(45) Date of Patent: Feb. 6, 2018

(54) BUS BAR MODULE AND POWER UNIT

(71) Applicant: Yazaki Corporation, Tokyo (JP)

(72) Inventors: Masaru Imai, Kakegawa (JP); Satoshi Hishikura, Kakegawa (JP); Terumichi Matsumoto, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 149 days.

(21) Appl. No.: 14/293,036

(22) Filed: Jun. 2, 2014

(65) Prior Publication Data

US 2014/0363723 A1 Dec. 11, 2014

(30) Foreign Application Priority Data

Jun. 7, 2013 (JP) ................................. 2013-121224

(51) Int. Cl.
*H01M 2/20* (2006.01)
*H01M 2/10* (2006.01)

(52) U.S. Cl.
CPC .......... *H01M 2/206* (2013.01); *H01M 2/1077* (2013.01); *H01M 2220/20* (2013.01)

(58) Field of Classification Search
CPC ................................................. H01M 2/206
USPC ................................................ 429/121, 160
See application file for complete search history.

(56) References Cited

U.S. PATENT DOCUMENTS

2013/0309553 A1* 11/2013 Kinoshita ........... H01M 2/1077
429/158
2014/0113494 A1 4/2014 Kinoshita et al.
2016/0028194 A1 1/2016 Nakayama et al.

FOREIGN PATENT DOCUMENTS

| JP | 2011-091003 A | 5/2011 | |
| JP | 2013-033707 A | 2/2013 | |
| JP | 2014191953 A | 10/2014 | |
| WO | WO 2012/102373 | * 8/2012 | .............. H01M 2/34 |

OTHER PUBLICATIONS

Notification of Reasons for Refusal of the Japanese Patent Office, dated Mar. 23, 2017, in corresponding Japanese Patent Application No. 2013-121224.

* cited by examiner

*Primary Examiner* — James Lee
(74) *Attorney, Agent, or Firm* — Locke Lord LLP; Howard M. Gitten

(57) ABSTRACT

The bus bar module includes: bus bars for connecting the batteries in series by connecting the positive electrode and the negative electrode of the adjacent batteries; a plurality of terminals electrically connected to the electrodes of the batteries; and a case for housing the bus bars and the terminals. Each terminal includes: a terminal main body on which an insertion hole is provided for inserting the electrode of the battery; and a projecting section projecting from a part of a peripheral edge of the terminal main body in a surface extending direction of the terminal main body. The terminal is arranged so that a projecting direction of the projecting section is along an arranging direction of the batteries.

4 Claims, 3 Drawing Sheets

BUS BAR MODULE AND POWER UNIT

CROSS REFERENCE TO RELATED APPLICATIONS

This application is on the basis of Japanese Patent Application No. 2013-121224, the contents of which are hereby incorporated by reference.

TECHNICAL FIELD

The present invention relates to a bus bar module and a power unit, in particular, a bus bar module for connecting a plurality of batteries in series, and a power unit having this bus bar module.

BACKGROUND ART

For example, a battery module as a driving source of an electric vehicle is mounted on the electric vehicle running with an electric motor, and a hybrid vehicle running with both an engine and the electric motor. This battery module has a group of single batteries composed of a plurality of arranged single batteries each having electrode terminals. A battery wiring module electrically connects the electrode terminals to each other (for example, see PTL 1).

As shown in FIG. 4, a battery wiring module 101 described in PTL 1 includes a plurality of coupling units 102 coupled in a horizontal direction (an arranging direction of the single batteries). Each coupling unit 102 includes: a bus bar 103 connecting an electrode terminal of one single battery to an electrode terminal of the other single battery adjacent to the one single battery; and a synthetic-resin-made bus bar housing 104 in which the bus bar 103 is housed.

A voltage detection terminal 105 for detecting a voltage of the electrode terminal when connected to the electrode terminal is housed in the bus bar housing 104. The voltage detection terminal 105 includes: a plate-shaped connection portion 150; and a barrel portion 104 extended from the connection portion 150 in an offset shape and connected to a voltage detection line 106.

Further, a barrel portion housing 104A allowing the barrel portion 151 to project forward of the bus bar housing 104 (downward in FIG. 4) is extended forward in substantially the center in a longitudinal direction of the bus bar housing 104. The barrel portion housing 104A is formed in a groove shape opening upward, and the barrel portion 151 is housed in an interior of the barrel portion housing 104A. In the conventional battery wiring module 101, for downsizing the arranging direction of the single batteries in the battery wiring module 101, a pitch between the single batteries adjacent to each other is reduced by extending the barrel portion housing 104A forward of the bus bar housing 104.

CITATION LIST

Patent Literature

PTL 1: JP, A, 2013-33707

SUMMARY OF INVENTION

Technical Problem

However, in the conventional battery wiring module 101, because the barrel portion housing 104A is extended forward of the bus bar housing 104 (a direction perpendicular to the arranging direction of the single batteries), there is a problem that a space in a direction perpendicular to the arranging direction of the single batteries is narrowed.

Accordingly, an object of the present invention is to provide a bus bar module and a power unit allowing a space in a direction perpendicular to the arranging direction of the batteries to be widen, or allowing to downsize in a direction perpendicular to the arranging direction of the batteries.

Solution to Problem

For attaining the object, according to a first aspect of the present invention, there is provided a bus bar module including:
a plurality of bus bars for connecting a plurality of batteries in series by connecting electrodes together of the adjacent batteries of the plurality of batteries arranged straight;
a plurality of terminals configured to be connected to the electrodes of the batteries; and
a case housing the plurality of bus bars and the plurality of terminals, wherein each terminal includes: a terminal main body provided with an insertion hole into which the electrode of the battery is inserted; and a projecting section projecting from a part of a peripheral edge of the terminal main body in a surface extending direction of the terminal main body, and wherein a projecting direction of the projecting section is arranged along an arranging direction of the batteries.

According to a second aspect of the present invention, there is provided the bus bar module as described in the first aspect,
wherein in the terminal, while the electrode of the battery is inserted into the insertion hole and arranged, the projecting section is provided at an end of the terminal main body in a direction crossing the arranging direction of the batteries, and
wherein the projecting sections of the terminals arranged adjacent to the arranging direction of the batteries are provided alternately side by side in the direction crossing the arranging direction.

According to a third aspect of the present invention, there is provided the bus bar module as described in the first or second aspect,
wherein the case is provided with a plurality of housing portions arranged parallel to the arranging direction of the batteries for housing the terminals,
wherein each housing portion is provided with a first housing section for housing the terminal main body and with a second housing section projected from the first housing section for housing the projecting section, and
wherein the second housing section is extended from the first housing section along the arranging direction of the batteries.

According to a fourth aspect of the present invention, there is provided a power unit comprising:
a battery assembly composed of a plurality of batteries of which positive electrodes and negative electrodes are alternately and oppositely overlapped with each other; and
the bus bar module as described in any one of the first to third aspects.

Advantageous Effects of Invention

According to the invention described in the first and fourth aspects, each terminal includes: a terminal main body provided with an insertion hole into which the electrode of the battery is inserted; and a projecting section projecting from a part of a peripheral edge of the terminal main body in a surface extending direction of the terminal main body. Therefore, a space in a direction perpendicular to the arranging direction of the batteries can be wider by a projecting size of the projecting section than the conventional bus bar module. Therefore, components such as a radiator tube can be arranged between the electrodes in the direction perpendicular to the arranging direction of the batteries. Alternatively, the bus bar module can be downsized in the direction perpendicular to the arranging direction of the batteries.

According to the invention described in the second aspect, in the terminal, while the electrode of the battery is inserted into the insertion hole and arranged, the projecting section is provided at an end of the terminal main body in a direction crossing the arranging direction, and the projecting sections of the terminals arranged adjacent to the arranging direction of the batteries are provided alternately side by side in the direction crossing the arranging direction. Therefore, the bus bar module can be prevented from being upsized in the arranging direction of the battery by the projecting size of the projecting section in comparison to the projecting sections provided side by side parallel to the arranging direction.

According to the invention described in the third aspect, the case is provided with a plurality of housing portions arranged parallel to the arranging direction of the batteries for housing the terminals, each housing portion is provided with a first housing section for housing the terminal main body and with a second housing section projected from the first housing section for housing the projecting section, and the second housing section is extended from the first housing section along the arranging direction of the batteries. Therefore, while the isolation between the adjacent terminals is secured to prevent the adjacent terminals from being short-circuited, a space in a direction perpendicular to the arranging direction of the batteries can be wider by an extending size of the second housing section than the conventional bus bar module.

These and other objects, features, and advantages of the present invention will become more apparent upon reading of the following detailed description along with the accompanied drawings.

DESCRIPTION OF EMBODIMENTS

Hereinafter, a bus bar module and a power unit according to an embodiment of the present invention will be explained with reference to FIGS. 1 to 3.

Figure 1:
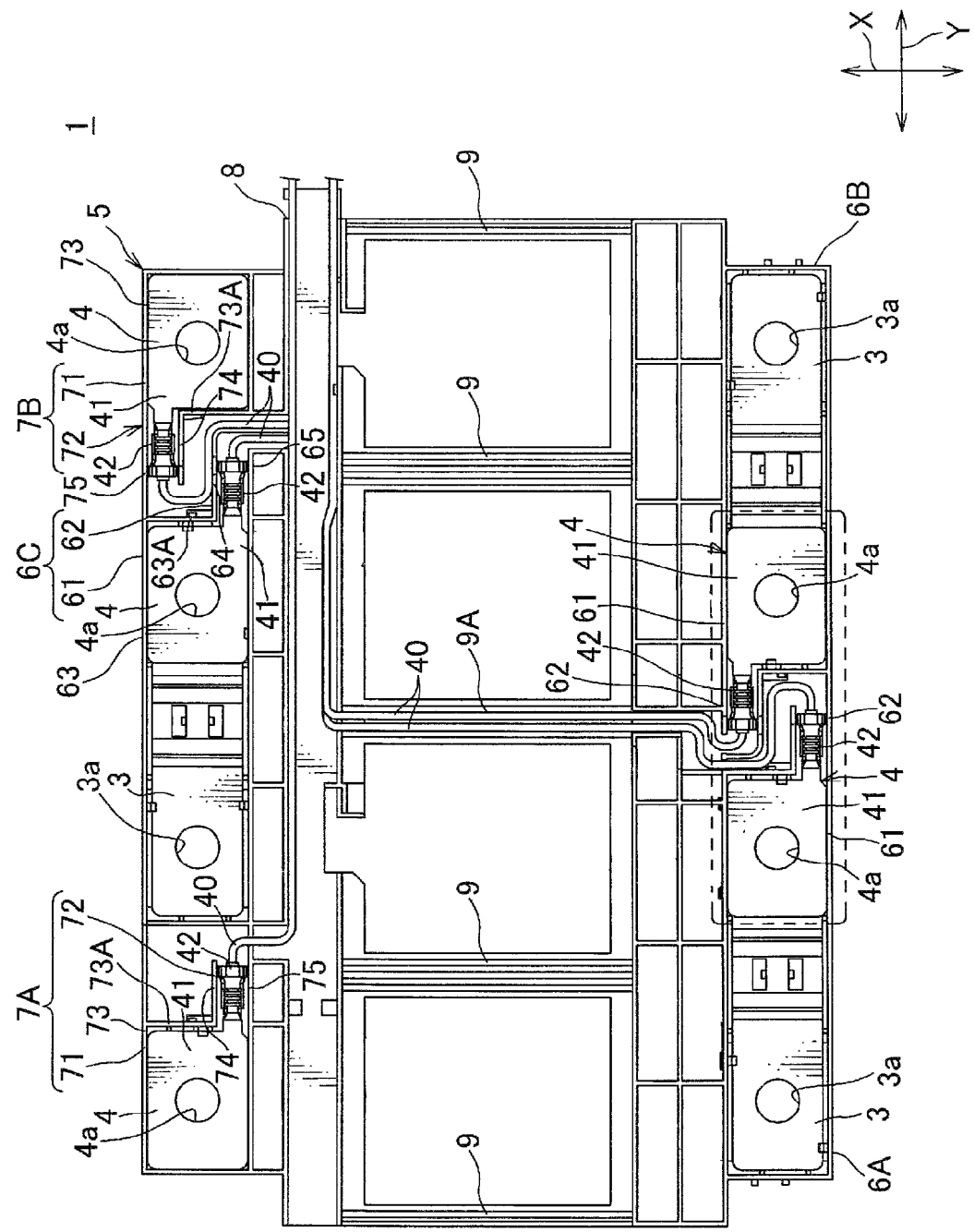
FIG. 1 is an exploded perspective view showing a power unit according to an embodiment of the present invention.
Figure 2:
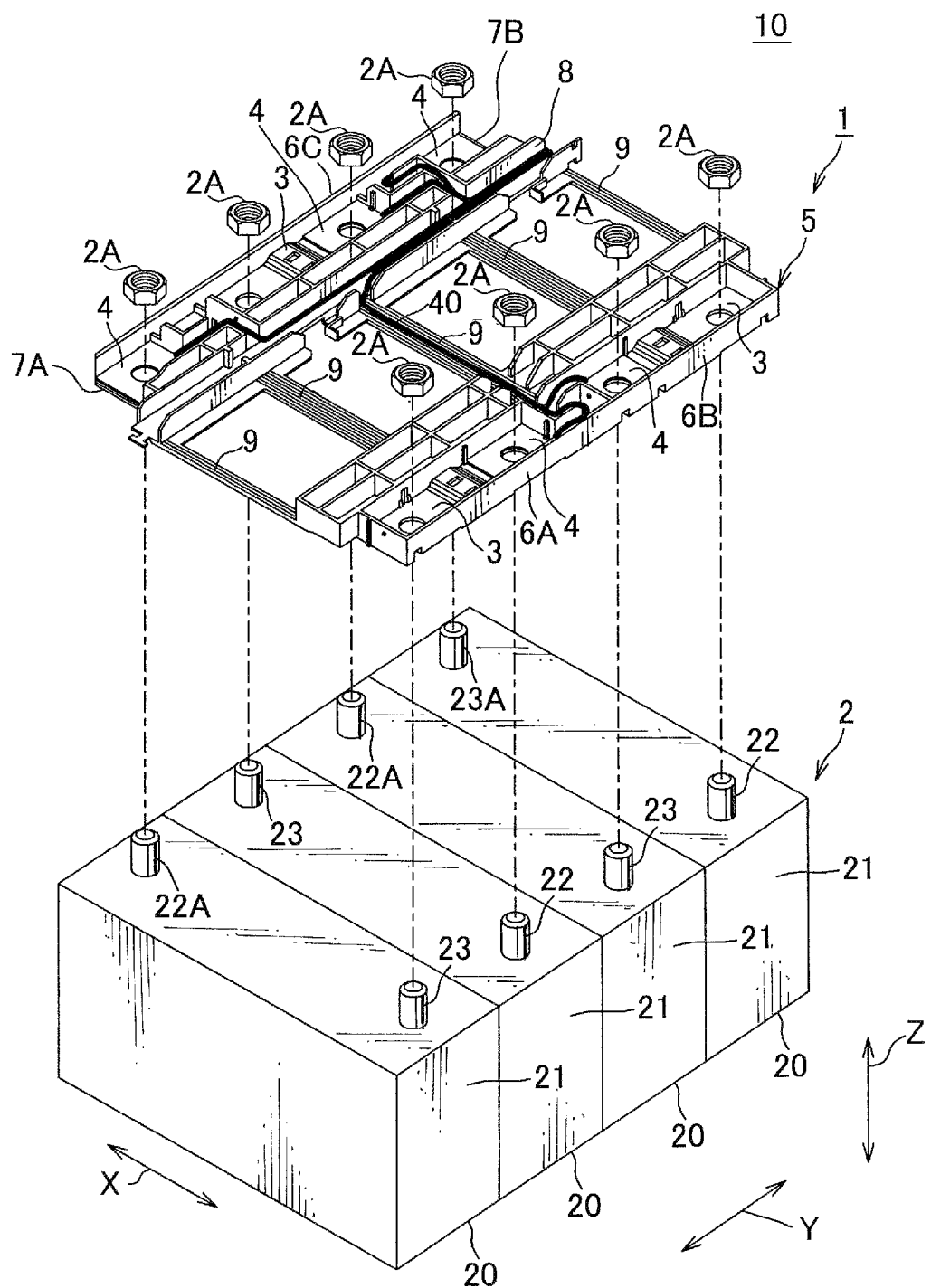
FIG. 2 is a plan view showing a bus bar module as a component of the power unit shown in FIG. 1.

As shown in FIGS. 1 and 2, a bus bar module 1 is attached to a top wall of a battery assembly 2 to form a power unit 10. This power unit 10 is mounted on an electric vehicle running with an electric motor, or a hybrid vehicle with both an engine and the electric motor to supply electric power to the electric motor.

As shown in FIG. 2, the battery assembly 2 includes: a plurality of batteries 20; and a fixing member (not shown) for fixing the plurality of batteries 20 while the batteries 20 are overlapped with each other. Further, each battery 20 includes: a battery main body 21 having a boxy chassis in which an electrolyte is filled; a positive electrode 22 (an example of an electrode) and a negative electrode 23 (an example of an electrode) respectively projected from one sidewall and the other sidewall of the battery main body 21. Each of these positive electrodes 22 and negative electrodes 23 is made of conductive metal and formed in a cylindrical shape, and an outer periphery thereof is provided with a screw groove screwed with a nut 2A.

Further, the batteries 20 are arranged in two rows in a manner that the positive electrodes 22 and the negative electrodes 23 are alternately provided on a straight line along an overlapping direction of the batteries 20. Here, an arrow Y in FIG. 2 indicates an arranging direction of the batteries 20 and a longitudinal direction of the bus bar module 1. An arrow X indicates a direction perpendicular to (crossing) the arranging direction of the batteries 20 and a width direction of the bus bar module 1. An arrow Z indicates a height direction of the bus bar module 1.

The bus bar module 1 connects the batteries 20 in series. As shown in FIGS. 1 and 2, the bus bar module 1 includes: a plurality of bus bars 3 for connecting the batteries 20 in series by connecting the positive electrode 22 and the negative electrode 23 of the batteries 20 adjacent to each other; a plurality of voltage detection terminals 4 electrically connected to the bus bars 3 respectively for detecting a voltage of each battery 20; a plurality of voltage detection lines 40 connected respectively to the voltage detection terminals 4; and a case 5 housing these bus bars 3, voltage detection terminals 4, and voltage detection lines 40. The electric motor is connected to electrodes 22A, 23A positioned at both ends of the batteries 20 and having mutually different polarities of the bus bar module 1 via a pair of power terminals (not shown), and then the bus bar module 1 supplies the electric power to the electric motor.

Each bus bar 3 is made by pressing a metal plate or the like, and as shown in FIG. 1 or the like, the metal plate is provided with a pair of through holes 3a for inserting the positive electrode 22 and the negative electrode 23 adjacent to each other. When the nuts 2A are respectively screwed with the positive electrode 22 and the negative electrode 23 inserted into the pair of through holes 3a, the bus bar 3 is fixed to and electrically connected to the positive electrode 22 and the negative electrode 23.

Each voltage detection terminal 4 is made by pressing a metal plate or the like, and as shown in FIG. 1, includes: a rectangular-plate-shaped electric contact section 41 (an example of a terminal main body) connected by overlapping with the bus bar 3; and a wire connection section 42 (an example of a projecting section) continued to a peripheral edge of the electric contact section 41 and projected from a part of the peripheral edge of the electric contact section 41 in a longitudinal direction of the bus bar module 1 (the arrow Y direction) to be connected to the voltage detection line 40.

As shown in FIG. 1, a through hole 4a (an example of an insertion hole) is provided at the center of the electric contact section 41. While the electrodes 22, 23 are inserted into the through holes 4a of the voltage detection terminal 4 and arranged, the wire connection section 42 is provided at an end of the peripheral edge of the electric contact section 41 along the width direction of the bus bar module 1 (the arrow X direction). This wire connection section 42 has a caulking piece for caulking a core wire of the voltage detection line 40. When any one of the positive electrode 22 and the negative electrode 23 is inserted into the through hole 4a, and the voltage detection terminal 4 is overlapped with the bus bar 3, the voltage detection terminal 4 is electrically connected to the bus bar 3. Further, when the core wire of the voltage detection line 40 is caulked with the caulking piece, the voltage detection line 4 is electrically connected to the voltage detection line 40.

As shown in FIG. 1, the case 5 is formed in substantially a rectangular shape similar to a top wall of the battery assembly 2, and overlapped with the top wall of the battery assembly 2. The case 5 is provided with: a plurality of bus bar housings 6A, 6B, 6C (an example of a housing portion) formed in a box shape able to house the bus bar 3 and the voltage detection terminal 4 overlapped with the bus bar 3 and arranged on a straight line along the arrow Y direction; a pair of terminal housings 7A, 7B (an example of the housing portion) formed in a box shape able to house the power terminal and the voltage detection terminal 4 overlapped with the power terminal; and a gutter-shaped wiring section 8 provided on a straight line parallel to the longitudinal direction of the bus bar module 1 (the arrow Y direction) and wiring the voltage detection line 40 connected to the voltage detection terminal 4 in the arrow Y direction. The bus bar housings 6A, 6B, 6C and the terminal housings 7A, 7B are respectively provided with connection housings 62, 72 (an example of a second housing section) for housing the wire connection section 42 of the voltage detection terminal 4 housed therein.

As shown in FIG. 1, in this embodiment, three bus bar housings 6A, 6B, 6C are provided. Two bus bars 6A, 6B in three bus bars 6A, 6B, 6C are arranged point symmetry and connected on a straight line in the arrow Y direction. The rest one bus bar 6C is positioned opposite to the two bus bars 6A, 6B in the arrow X direction. Further, a pair of terminal housings 7A, 7B is respectively provided at both sides of the bus bar housing 6C in the arrow Y direction. In this way, the housings 6A, 6B, 6C, 7A, 7B are provided in two rows spaced in the width direction of the bus bar module 1 (the arrow X direction), and the wiring section 8 is arranged parallel to the two rows in between the two rows of the housings 6A, 6B, 6C, 7A, 7B.

The connection housings 62 of two bus bar housings 6A, 6B are alternately arranged side by side in the width direction of the bus bar module 1 (the arrow X direction). The connection housings 62, 72 of the bus bar housing 6C and the terminal housing 7B of a pair of terminal housings 7A, 7B provided on both sides of the bus bar housing 6C are alternately arranged side by side in the width direction of the bus bar module 1 (the arrow X direction).

Each of the bus bar housings 6A, 6B, 6C includes: a first main body housing 61 (an example of a first housing section) for housing the bus bar 3 and the electric contact section 41 of the voltage detection terminal 4; and the connection housing 62 for housing the wire connection section 42 of the voltage detection terminal 4 housed in the first main body housing 61. The first main body housing 61 includes: a bottom wall (not shown) on which the bus bar 3 is placed; and a peripheral wall 63 extended vertically from the bottom plate for surrounding the bus bar 3. Both sides of the bottom wall in the arrow Y direction are opened for inserting the electrodes 22, 23 of the battery 20. An outlet port 60 (shown in FIG. 3) for guiding out the wire connection section 42 of the voltage detection terminal 4 housed in the first main body housing 61 is formed by partially cutting off a sidewall 63A as a part of the peripheral wall 63 and extended vertically at an end in the longitudinal direction of the bus bar module 1.

Figure 3:
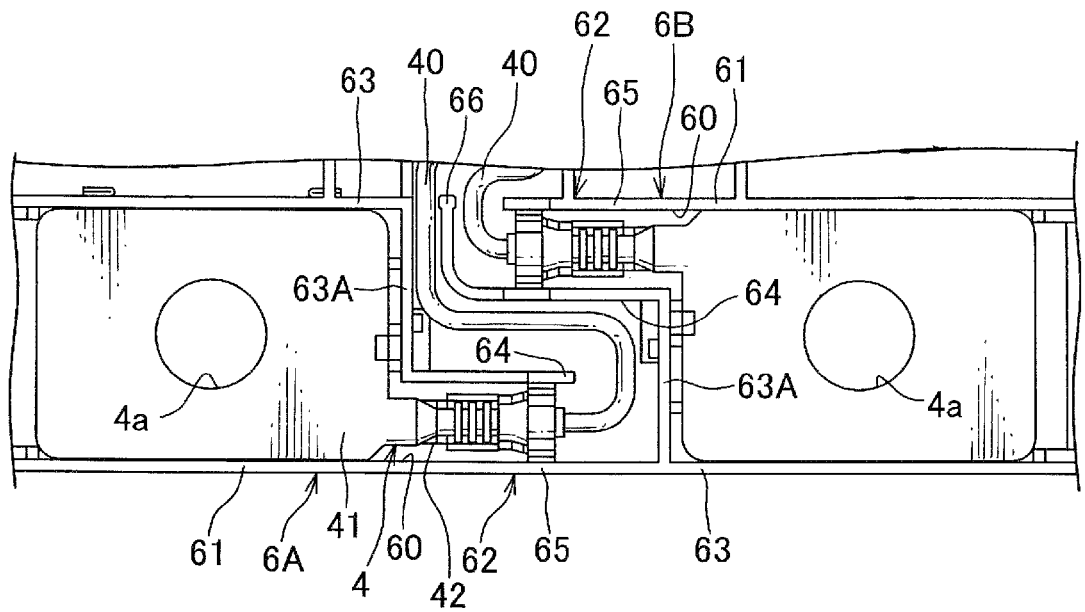
FIG. 3 is a partially enlarged view showing the bus bar module shown in FIG. 2.
Figure 4:
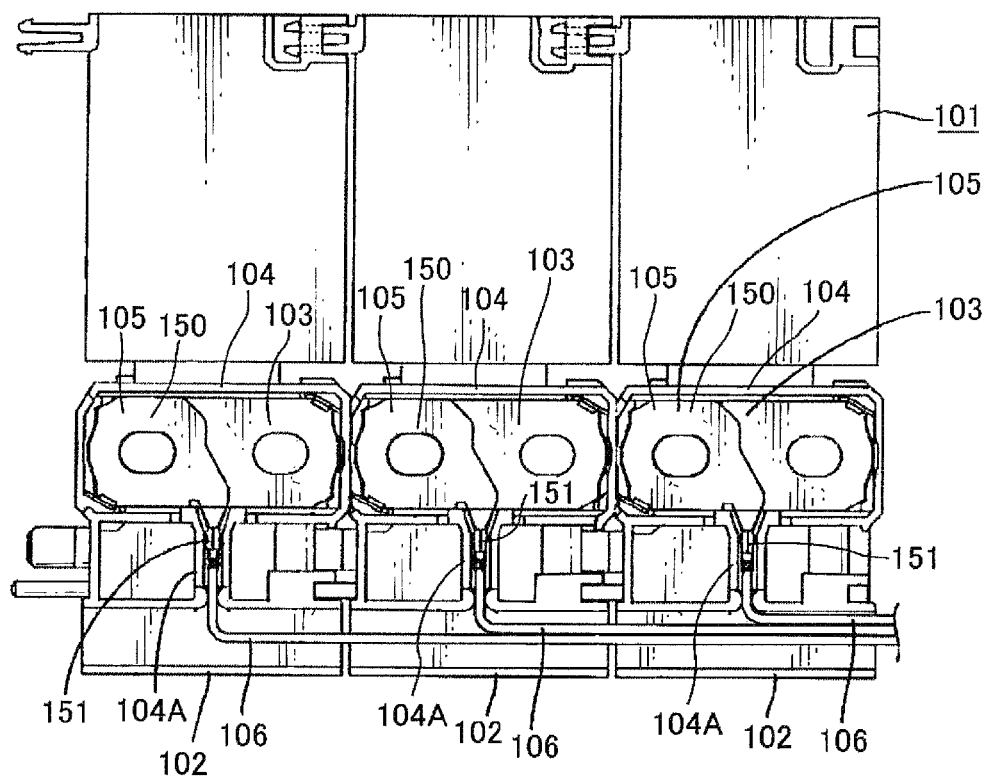
FIG. 4 is a plan view showing a conventional battery wiring module.

As shown in FIG. 3, the connection housing 62 includes: a continuous wall (not shown) continued from a bottom wall of the first main body housing 61; and a pair of standing walls 64, 65 vertically extended from the continuous wall for housing the wire connection section 42 of the voltage detection terminal 4. One ends of the pair of standing walls 64, 65 are respectively continued to both edges of the outlet port 60, and the other ends of the pair of standing walls 64, 65 are extended in the longitudinal direction of the bus bar module 1 (the arrow Y direction).

Further, as shown in FIG. 3, an inner connection housing 62 in the width direction of the bus bar module 1 of the connection housings 62 arranged alternately side by side in the width direction of the bus bar module 1 (the arrow X direction) in the adjacent bus bar housings 6A, 6B is provided with a partition wall 66 continued to the other end of the standing wall 64 and extended along the width direction of the bus bar module 1 for partitioning the voltage detection lines 40 respectively housed in the adjacent bus bar housings 6A, 6B.

As shown in FIG. 1, each of the pair of terminal housings 7A, 7B includes: a second main body housing 71 (an example of a first housing section) for housing the power terminal and the electric contact section 41 of the voltage detection terminal 4; and the connection housing 72 for housing the wire connection section 42 of the voltage detection terminal 4 housed in the second main body housing 71. The second main body housing 71 includes: a bottom wall (not shown) on which the power terminal and the voltage detection terminal 4 overlapped with each other are placed; and a peripheral wall 73 vertically extended from the bottom wall for surrounding the power terminal and the voltage detection terminal 4. The bottom wall is provided with a through hole (not shown) overlapped with the through hole 4a of the voltage detection terminal 4. An outlet port for guiding out the wire connection section 42 of the voltage detection terminal 4 housed in the second main body housing 71 is formed by partially cutting off a sidewall 73A as a part of the peripheral wall 73 and extended vertically at an end in the longitudinal direction of the bus bar module 1.

The connection housing 72 includes: a continuous wall (not shown) continued from the bottom wall; and a pair of standing walls 74, 75 vertically extended from the continuous wall for housing the wire connection section 42 of the voltage detection terminal 4. One ends of the pair of standing walls 74, 75 are respectively continued to both edges of the outlet port, and the other ends of the pair of standing walls 74, 75 are extended in the longitudinal direction of the bus bar module 1 (the arrow Y direction).

Further, the case 5 is provided with a plurality of connection sections 9 for connecting the wiring section 8 with the bus bar housings 6A, 6B. The plurality of connection sections 9 is extended parallel to each other in the width direction of the bus bar module 1. The connection section 9A positioned in the center of the longitudinal direction of the bus bar module 1 of the plurality of connection sections 9 is provided continuously on the continuous wall of the bus bar housings 6A, 6B. The voltage detection lines 40 continuously guided out from the connection housings 62 of the bus bar housings 6A, 6B are placed on the connection section 9A. These voltage detection lines 40 are wired to the wiring section 8 via the connection section 9A.

Next, an assembling procedure of the power unit 10 having the above configuration will be explained with reference to FIG. 2. First, the bus bar 3, the voltage detection terminal 4, the case 5, and the like are separately produced, and the core wire of the voltage detection line 40 is caulked with the caulking piece at the wire connection section 42 of the voltage detection terminal 4. Then, the bus bars 3 are respectively placed on the bottom walls of the bus bar housings 6A, 6B, 6C of the case 5. Then, the voltage detection terminal 4 is moved close to the bottom wall in a manner that the projecting direction of the wire connection section 42 is oriented along the longitudinal direction of the bus bar module 1 (the arrow Y direction), and overlapped with the bus bar 3. Resultingly, the electric contact section 41 is housed in the first main body housing 61, and the wire connection section 42 is housed in the first connection housing 62. At the same time, a pair of openings provided at the bottom wall side of the bus bar housing 6 and a pair of through holes 3a provided on the bus bar 3 are overlapped with each other, and a through hole 4a provided on the voltage detection terminal 4 is overlapped with one of the pair of through holes 3a. Then, the other ends of the voltage detection lines 40 housed in the bus bar housings 6A, 6B and connected to the voltage detection terminals 4 are guided out from the connection housings 62 and wired in the wiring section 8 via the connection section 9A. Further, the other end of the voltage detection line 40 housed in the bus bar housing 6C and connected to the voltage detection terminal 4 is guided out from the connection housing 62 and wired in the wiring section 8.

Next, the power terminals are placed on the bottom walls of the terminal housings 7A, 7B. Then, the voltage detection terminals 4 are moved close to the bottom walls to be overlapped with the power terminals. Resultingly, the electric contact section 41 is housed in the second main body housing 71, and the wire connection section 42 is housed in the second connection housing 72. The through holes provided on the bottom walls of the terminal housings 7A, 7B are overlapped with the through holes 4a provided on the voltage detection terminals 4. Then, the other ends of the voltage detection lines 40 housed in the terminal housings 7A, 7B and connected to the voltage detection terminals 4 are guided out from the connection housing 72 and wired in the wiring section 8.

Lastly, the case 5 is moved close to the top wall of the battery assembly 2, and the positive electrode 22 and the negative electrode 23 are inserted into the openings of the bottom walls of the case 5, the through holes 3a of the bus bars 3, and the through holes 4a of the voltage detection terminals 4. Then, in this state, the nut 2A is screwed. At this time, because the wire connection section 42 is projected in the longitudinal direction of the bus bar module 1 (the arrow Y direction), a tool can screw the nuts 2A with the electrodes 22, 23 without interfering with the wire connection section 42. In this way, the electrodes 22, 23 of the batteries 20, the bus bars 3, and the voltage detection terminals 4 are electrically connected to each other and fixed. Thus, the assembling of the power unit 10 is finished.

According to the above embodiment, each voltage detection terminal 4 (terminal) includes: the electric contact section 41 (terminal main body) on which the through hole 4a (insertion hole) is provided for inserting the electrodes 22, 23; and the wire connection section 42 (projecting section) projecting from a part of a peripheral edge of the electric contact section 41 in a surface extending direction of the electric contact section 41. Further, the projection direction of the wire connection section 42 (the arrow Y direction) is along the arranging direction of the batteries. Therefore, a space in a direction perpendicular to the arranging direction of the batteries (the arrow X direction) can be wider by a projecting size of the wire connection section 42. Therefore, components such as a radiator tube can be arranged between the electrodes 22, 23 in the direction perpendicular to the arranging direction of the batteries. Alternatively, the bus bar module 1 can be downsized in the direction perpendicular to the arranging direction of the batteries (arrow X direction).

Further, the above embodiment, the voltage detection terminal 4 is arranged so that the projection direction of the wire connection section 42 (the arrow Y direction) is along the arranging direction of the batteries, and away from the through hole 3a of the bus bar 3 (toward an outside of the main body housings 61, 71). However, the present invention is not limited to this. The voltage detection terminal 4 may be arranged so that the projection direction of the wire connection section 42 is along the arranging direction of the batteries, and toward the through hole 3a of the bus bar 3 (toward an inside of the main body housings 61, 62).

Incidentally, the above embodiments only represent typical embodiments of the present invention, and the present invention is not limited to the embodiments. Namely, it will be obvious to those skilled in the art that various changes may be made without departing from the scope of the invention. Even by such change, as long as the change is provided with the configuration of the bus bar module 1 of the present invention, of course, it is included in a category of the present invention.

REFERENCE SIGNS LIST 1 bus bar module
10 power unit
2 battery assembly
3 bus bar
4 voltage detection terminal (an example of terminal)
4a through hole (an example of insertion hole)
5 case
41 electric contact section (an example of terminal main body)
42 wire connection section (an example of projecting section)
Y arranging direction

What is claimed is:
1. A bus bar module comprising:
a plurality of bus bars for connecting a plurality of batteries in series by connecting electrodes of each of the batteries in the series together to an adjacent battery in the series formed by the plurality of batteries, the plurality of batteries being arranged in an arranging direction;
a plurality of terminals configured to be connected to the electrodes of the batteries; and
a case housing the plurality of bus bars and the plurality of terminals,
wherein each terminal includes: a terminal main body electrically connected to an electrode of a respective battery of the plurality of batteries; and a projecting section projecting along the arranging direction as a wire connection section from a part of a peripheral edge of the terminal main body in a surface extending direction of the terminal main body,
the projecting section forms the wire connection section extending in a direction along the arranging direction,
when the terminal is electrically connected to an electrode of the respective battery of the plurality of batteries, the projecting section is provided at an end of a peripheral edge of the terminal main body, in a direction crossing the arranging direction of the batteries, the plurality of bus bars are arranged along the arranging direction in two rows, wherein at least some of the terminals are arranged adjacent to one another within a same row among one of the two rows, and the projecting sections of the terminals adjacently arranged are provided alternately side by side in the direction crossing the arranging direction.

2. The bus bar module as claimed in claim 1, wherein the case is provided with a plurality of housing portions arranged parallel to the arranging direction of the batteries for housing the terminals, wherein each housing portion is provided with a first housing section for housing the terminal main body and with a second housing section projected from the first housing section for housing the projecting section, and wherein the second housing section is extended from the first housing section along the arranging direction of the batteries.

3. A power unit comprising:

a battery assembly composed of a plurality of batteries of which positive electrodes and negative electrodes are alternately and oppositely overlapped with each other; and the bus bar module as claimed in claim 1.

4. A power unit comprising:

a battery assembly composed of a plurality of batteries of which positive electrodes and negative electrodes are alternately and oppositely overlapped with each other; and the bus bar module as claimed in claim 2.

* * * * *